US006938901B2

(12) United States Patent
Tsuchiya et al.

(10) Patent No.: US 6,938,901 B2
(45) Date of Patent: Sep. 6, 2005

(54) COMBUSTION GAS SEAL FOR INJECTOR AND SEALING STRUCTURE WITH THE COMBUSTION GAS SEAL

(75) Inventors: Tomihisa Tsuchiya, Toyota (JP); Kyosuke Ohashi, Toyota (JP); Kenji Ohkubo, Toyota (JP); Masahiro Kawabata, Nihonmatsu (JP); Junichi Nakayama, Nihonmatsu (JP); Tadashi Abiko, Nihomatsu (JP)

(73) Assignees: Toyota Jidosha Kabushiki Kaisha, Toyota (JP); NOK Corporation, Tokyo (JP)

( * ) Notice: Subject to any disclaimer, the term of this patent is extended or adjusted under 35 U.S.C. 154(b) by 0 days.

(21) Appl. No.: 10/450,834

(22) PCT Filed: Sep. 26, 2001

(86) PCT No.: PCT/JP01/08380

§ 371 (c)(1),
(2), (4) Date: Dec. 3, 2003

(87) PCT Pub. No.: WO02/052148

PCT Pub. Date: Jul. 4, 2002

(65) Prior Publication Data

US 2004/0080115 A1 Apr. 29, 2004

(30) Foreign Application Priority Data

Dec. 26, 2000 (JP) ....................................... 2000-395924
May 31, 2001 (JP) ....................................... 2001-165339

(51) Int. Cl.[7] ................................................ B60T 11/236

(52) U.S. Cl. ........................ 277/440; 277/437; 277/438

(58) Field of Search ................................ 277/440, 437, 277/438

(56) References Cited

U.S. PATENT DOCUMENTS 3,244,377 A 4/1966 Roosa ........................ 239/533
3,750,960 A 8/1973 Back et al. ................. 239/533

FOREIGN PATENT DOCUMENTS

| | | |
|---|---|---|
| JP | 57-54647 | 3/1982 |
| JP | 60-178697 | 11/1985 |
| JP | 1-176747 | 12/1989 |
| JP | 05-240356 | 9/1993 |
| JP | 08-042700 | 2/1996 |
| WO | WO02/12717 | 2/2002 |

*Primary Examiner*—Enoch Peavey
(74) *Attorney, Agent, or Firm*—Jacobson Holman PLLC

(57) ABSTRACT

The invention relates to a combustion gas seal for injectors and to a seal structure disposed therewith, for preventing leakage of combustion gas in a state in which an injector is mounted to an engine head. And, the number of parts is reduced, vibration and noise are reduced, and sealing performance is improved. A tapered surface, in which an clearance between the tapered surface and an inner peripheral surface of a mounting hole of the engine head narrows from an engine bore side towards an atmospheric side, is disposed at a groove bottom of an attachment groove of the injector, and an abutment portion that abuts against the tapered surface is disposed at the combustion gas seal for injectors.

9 Claims, 8 Drawing Sheets

COMBUSTION GAS SEAL FOR INJECTOR AND SEALING STRUCTURE WITH THE COMBUSTION GAS SEAL

This is a nationalization of PCT/JP01/08380, filed Sep. 26, 2001 and published in Japanese.

TECHNICAL FIELD

The present invention relates to a combustion gas seal for injectors and to a seal structure disposed therewith, for preventing leakage of combustion gas in a state, in which an injector is mounted to an engine head.

BACKGROUND ART

Conventionally, there have been combustion gas seals for injectors of the type shown, for example, in FIGS. 13 and 14.

FIG. 13 is a schematic structural diagram showing a state, in which an injector is mounted to an engine head. FIG. 14 is a schematic diagram for describing a seal structure of a combustion gas seal for injectors according to conventional art.

Here, in the case where an injector 50 is mounted to an engine head 60, it is necessary to prevent leakage of combustion gas from a neighborhood of the mounted portion of the injector 50.

Thus, washer-shaped seals 100 and 200 are conventionally provided in two locations on the mount of the injector.50 as shown in FIG. 13 to prevent leakage of combustion gas.

These seals 100 and 200 are formed from a metal such as copper. As shown in FIG. 14, these seals 100 and 200 carry out sealing by a clamping force Q due to a clamping force obtained when the injector 50 is mounted to the engine head 60.

Here, as shown, for example, in FIG. 13, the clamping force is obtained by a clamp 70 pushing the injector 50 due to the clamp 70 being clamped to the engine head 60 by a screw 71.

However, in the case of the configuration of the above-described conventional art, the number of parts increases because, in order to carry out the sealing, parts such as sleeves made of ductile metals (copper, brass, etc.) are necessary in addition to the metal washer-shaped seals 100 and 200.

Also, as mentioned above, because the metal washer-shaped seals 100 and 200 are made to seal using a clamping force, the clamp 70, the sleeve, and the seals 100 and 200 contact each other as like metal members. Therefore, vibration is promoted by vibration resulting from the engine and the like, which leads to noise because large sounds are generated by the portions of metal contact.

Moreover, load based on vibrations and heat causes reduction in the clamping force whereby sealing performance is degraded with time.

It is an object of the present invention to provide a combustion gas seal for injectors and a seal structure disposed therewith, in which the number of parts is reduced, vibration and noise are reduced, and sealing performance is improved.

DISCLOSURE OF THE INVENTION

In order to achieve the above-described object, a seal structure of the invention comprises: amounting hole that mounts an injector and is disposed in an engine head; an annular attachment groove disposed in the injector; and a resin-made combustion gas seal for injectors that is attached to the attachment groove and seals an annular space between the mounting hole and the injector, wherein an inclined surface, in which an clearance between the inclined surface and an inner peripheral surface of the mounting hole narrows towards a opposite-pressurized side, is disposed at a groove bottom of the attachment groove.

Thus, sealing is accomplished with the resin-made combustion gas seal for injectors, a clamp or the like is not necessary, vibration is absorbed, and noise is not generated. Also, due to the inclined surface disposed at the attachment groove, surface pressure is generated at the mounting hole side when the combustion gas seal for injectors is pressurized from the pressurized side.

The inclined surface may be a tapered surface whose diameter expands towards the opposite-pressurized side.

Also, the inclined surface is preferably configured by plural tapered surfaces having respectively different angles of inclination, and the angle of inclination of each tapered surface is set so that a degree of diameter expansion of the tapered surfaces becomes successively larger towards the opposite-pressurized side.

Thus, surface pressure is secured by the tapered surface whose degree of diameter expansion is small at the pressurized side, and sliding advancement of combustion gas seal for injectors can be reduced by the tapered surface whose degree of diameter expansion is large at the opposite-pressurized side.

Moreover, the inclined surface may be a curved surface in which a degree of diameter expansion becomes larger towards the opposite-pressurized side.

Thus, sliding advancement of the combustion gas seal for injectors can be reduced.

The attachment groove may be configured by a two-stepped groove that includes a first groove portion, which has a deep groove bottom, and a second groove portion, which has a shallower groove bottom than that of the first groove portion, with the inclined surface being disposed between the first groove portion and the second groove portion, and the combustion gas seal for injectors may be attached, in an initial state, at a portion at which the first groove portion and the inclined surface are disposed.

Thus, because the combustion gas seal for injectors can slid along the second groove portion, no positional regulation is carried out and generation of surface pressure resulting from the inclined surface can be maintained, even in a case where the combustion gas seal for injectors has exceeded the inclined surface due to being pressurized.

A cross-sectional shape of the combustion gas seal for injectors may be rectangular.

An inclined surface, in which the clearance between the inclined surface and the inner peripheral surface of the mounting hole narrows towards the opposite-pressurized side along the inclined surface disposed at the groove bottom of the attachment groove, is preferably disposed at a seal surface side, against the groove bottom of the attachment groove, of the combustion gas seal for injectors.

In a resin-made combustion gas seal for injectors of the invention that is attached at an attachment groove disposed in an injector mounted in a mounting hole of an engine head and seals an annular space between the mounting hole and the injector, the combustion gas seal for injectors includes a first seal surface that is in tight contact with an inner peripheral surface of the mounting hole, and a second seal surface that is in tight contact with a groove bottom of the attachment groove, wherein an abutment portion that abuts against an inclined surface, in which an clearance between the inclined surface and an inner peripheral surface of the mounting hole narrows towards a opposite-pressurized side, that is disposed at a groove bottom of the attachment groove is disposed at the second seal surface.

An inclined surface, in the clearance between the inclined surface and the inner peripheral surface of the mounting hole narrows towards the opposite-pressurized side along the inclined surface disposed at the groove bottom of the attachment groove, is preferably disposed at the abutment portion.

BEST MODE FOR CARRYING OUT THE INVENTION

Preferable embodiments of the invention will be exemplarily described in detail below with reference to the drawings. Unless otherwise specified, dimensions, materials, shapes, and relative dispositions of structural members described in the embodiments are not intended to limit the scope of the invention only thereto.

(First Embodiment)

A combustion gas seal for injectors and a seal structure disposed therewith according to a first embodiment of the invention will be described with reference to FIGS. 1 to 8.

Figure 1:
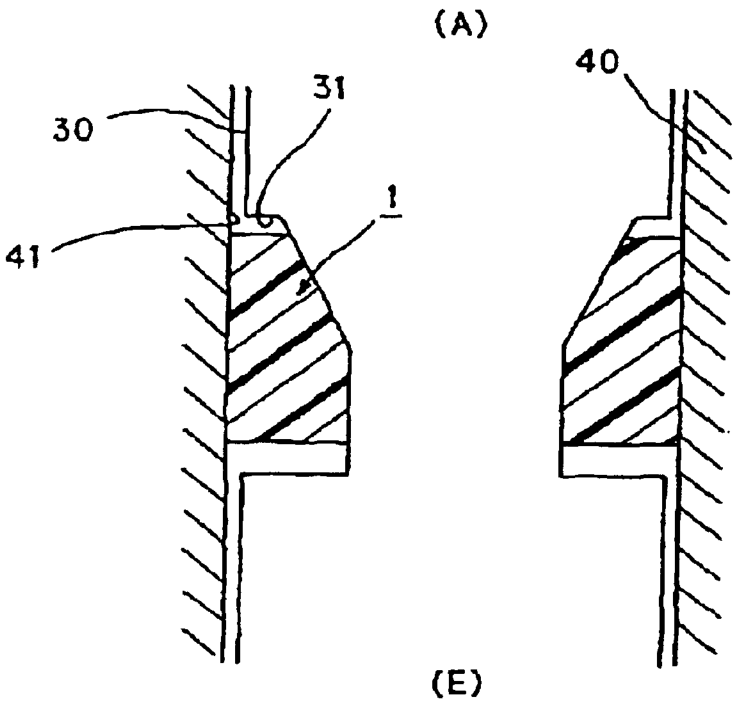
FIG. 1 is a schematic cross-sectional diagram showing a seal structure according to a first embodiment of the invention.
Figure 2:
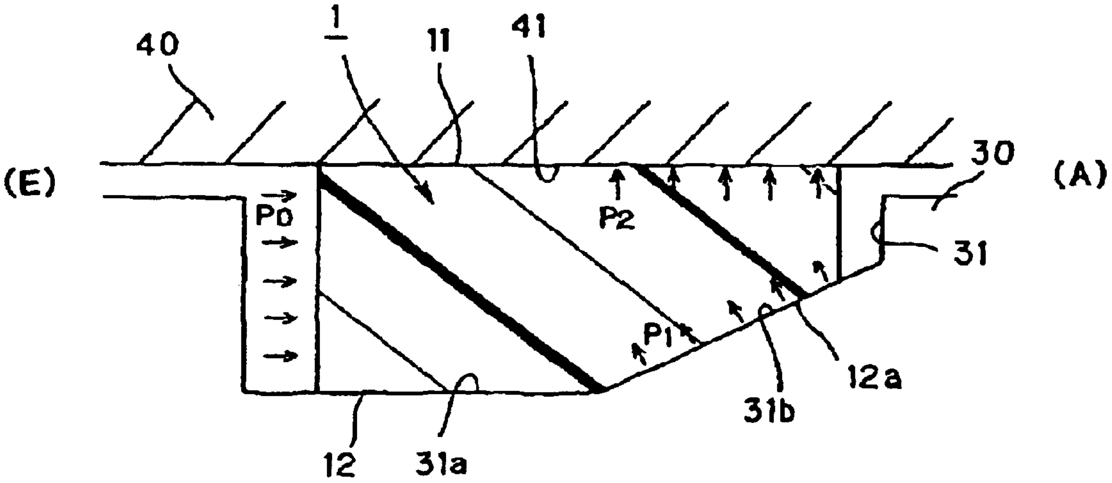
FIG. 2 is a schematic cross-sectional diagram showing the seal structure according to the first embodiment of the invention.
Figure 3:
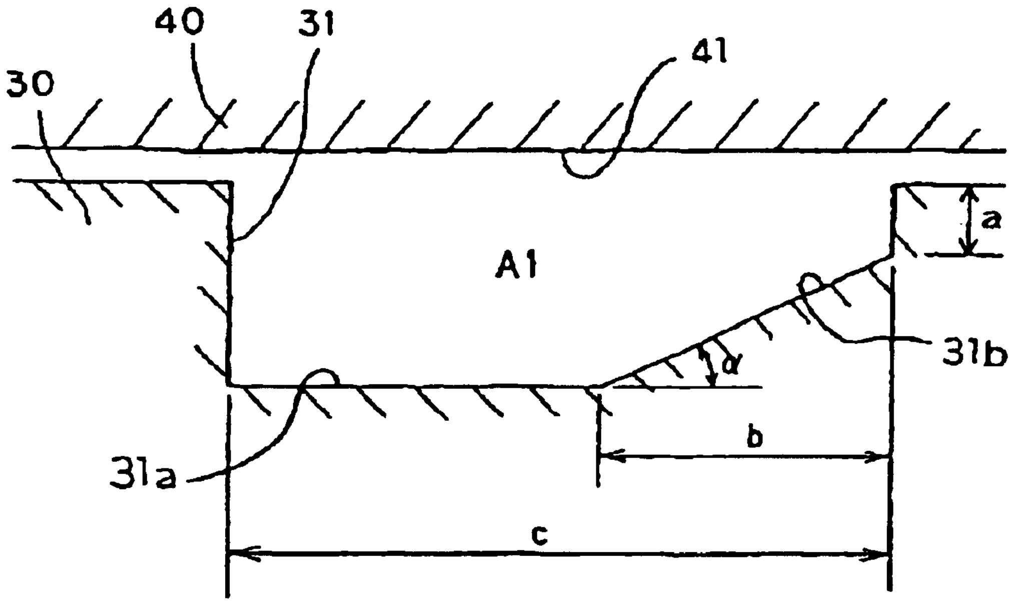
FIG. 3 is a schematic cross-sectional diagram showing a mating structure for mounting a combustion gas seal for injectors according to the first embodiment of the invention.
Figure 4:
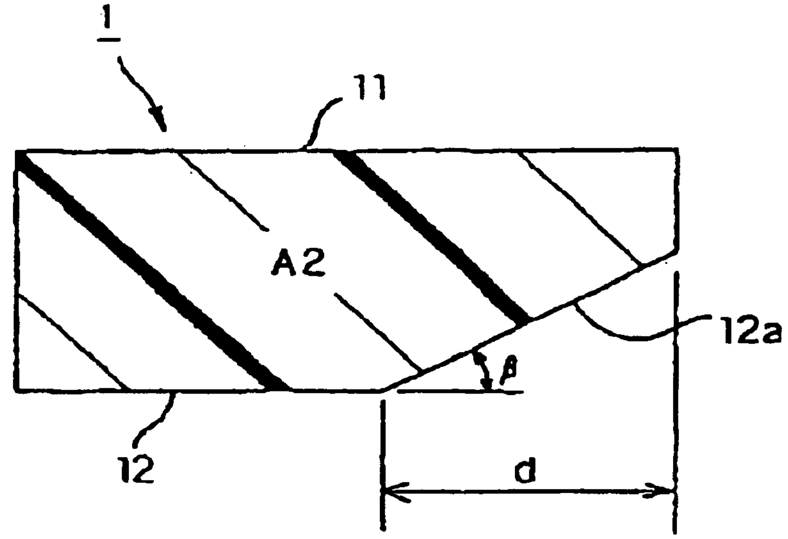
FIG. 4 is a cross section of the combustion gas seal for injectors according to the embodiments of the invention.

FIGS. 1 and 2 are schematic cross-sectional diagrams showing the seal structure according to the first embodiment of the invention, with FIG. 2 showing an enlarged view of a portion of FIG. 1. And, FIG. 3 is a schematic cross-sectional diagram showing a mating structure (structure of engine head and injector) for mounting the combustion gas seal for injectors according to the first embodiment of the invention. FIG. 4 is a cross section of the combustion gas seal for injectors according to the embodiments of the invention.

Figure 5:
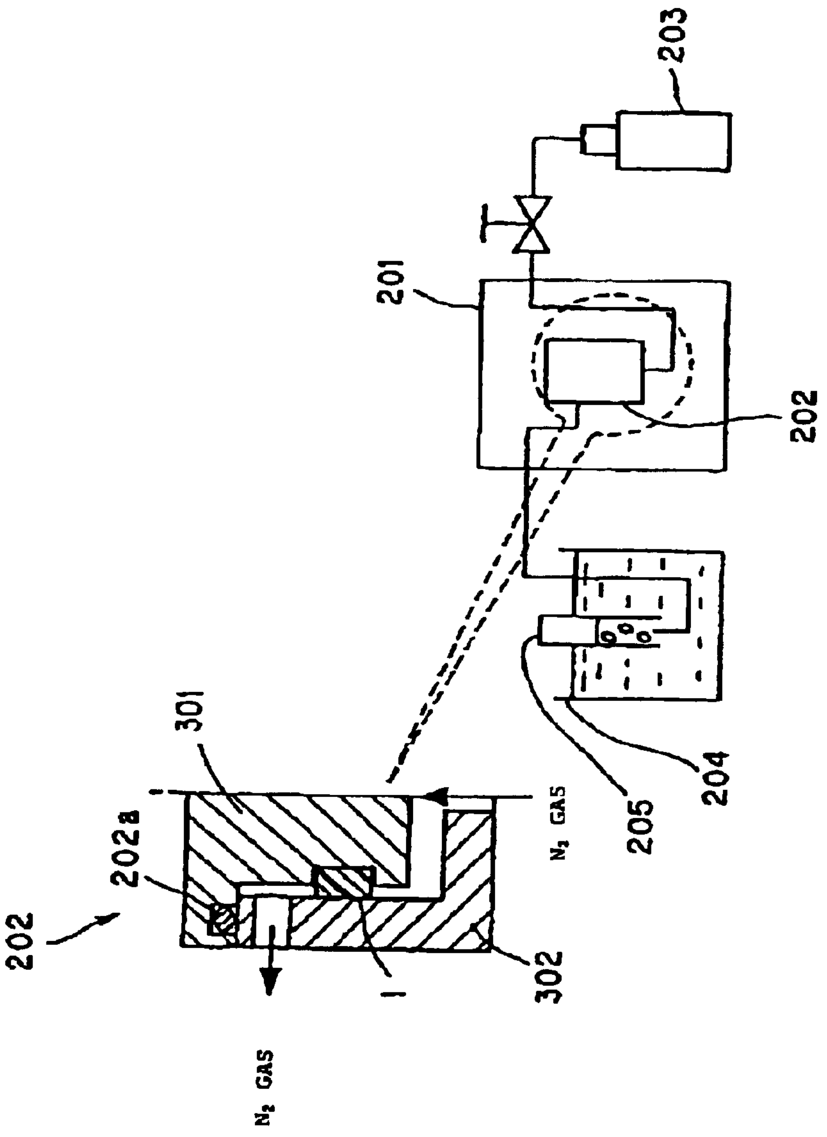
FIG. 5 is a schematic structural view of a testing device for evaluating the combustion gas seal for injectors according to the embodiments of the invention.
Figure 6:
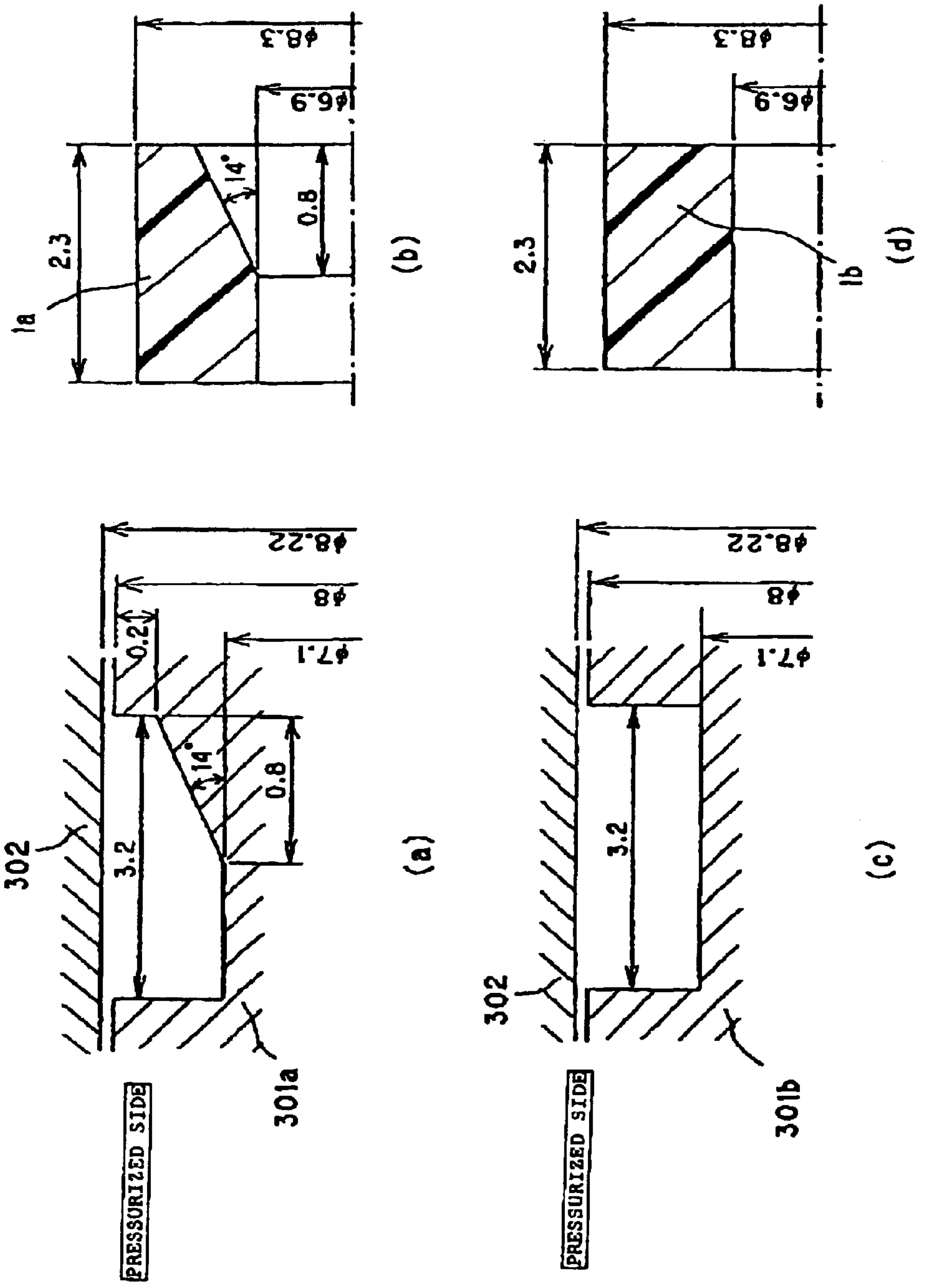
FIGS. 6 are explanatory diagrams of samples used in the evaluation testing.
Figure 7:
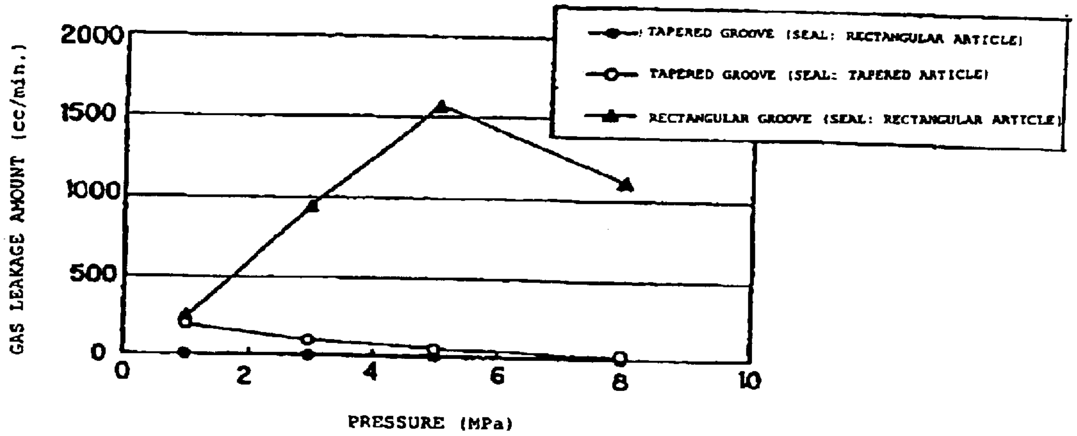
FIG. 7 is a graph showing results of the evaluation testing.
Figure 8:
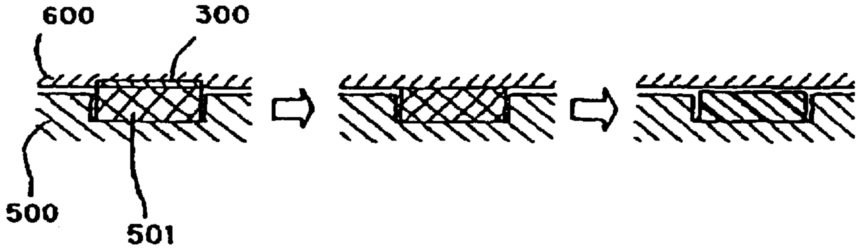
FIGS. 8 are diagrams for describing a malfunction of a comparative example.

FIG. 5 is a schematic structural view of a testing device for evaluating the combustion gas seal for injectors according to the embodiments of the invention. FIGS. 6 are explanatory diagrams of samples used in the evaluation testing. FIG. 7 is a graph showing results of the evaluation testing. FIGS. 8 are diagrams for describing a malfunction of a comparative example.

A combustion gas seal for injectors 1 according to the present embodiment is for preventing combustion gas from leaking from a periphery of a mounting hole when an injector 30 is mounted in a mounting hole disposed in an engine head 40.

As shown in FIG. 1, the combustion gas seal for injectors 1 seals an annular space between (an outer periphery of) the injector 30 and an inner peripheral surface 41 of the mounting hole of the engine head 40. The combustion gas seal for injectors 1 is also used by being attached to an annular attachment groove 31 disposed in (an outer periphery of) an edge portion of the injector 30.

Here, the combustion gas seal for injectors 1 according to the present embodiment is formed by a resin material having high heat resistance. More specifically, pure PTFE or a resin composition comprising PTFE and a filler, or a resin material such as an elastomer having flexibility, can be used.

Also, the combustion gas seal for injectors 1 has a ring shape in which an outer diameter thereof is larger than an inner diameter of the mounting hole of the engine head 40 and an inner diameter thereof is smaller than an outer diameter of a groove bottom 31*a* of the attachment groove 31.

Therefore, the combustion gas seal for injectors 1 is ordinarily attached in a compressed state irrespective of the presence or absence of pressure caused by combustion gas. Additionally, the outer diameter side and the inner diameter side of the combustion gas seal for injectors 1 are in tight contact with the inner peripheral surface 41 of the mounting hole of the engine head 40 and the groove bottom 31*a* of the attachment groove 31 of the injector 30, respectively, and exhibit sealing performance.

That is, the combustion gas seal for injectors 1 is disposed with a first seal surface 11, which is in tight contact with the inner peripheral surface 41 of the mounting hole of the engine head 40, and a second seal surface 12, which is in tight contact with the groove bottom 31*a*.

As described above, because the combustion gas seal for injectors 1 according to the present embodiment is a resin material, it absorbs vibration even if vibration or the like is transmitted thereto, does not emit noise, and exhibits a sound-insulating effect.

Incidentally, by using a combustion gas seal for injectors formed by a resin material as described above, the number of parts is reduced because a clamp or the like becomes unnecessary, assemblability becomes better, and costs can be reduced. Also, noise can be reduced because metal contact can be eliminated.

However, it was understood that, in a case where the cross-sectional shape of the attachment groove is rectangular, sealing performance is reduced with time due to creep deformation and the influence of heat.

This point will be described with reference to FIGS. 8.

As is illustrated, a combustion gas seal for injectors 300 has a cross-sectional shape that is rectangular. The combustion gas seal for injectors 300 is used by being attached to an attachment groove 501, which is disposed in an injector 500 and has a cross-sectional shape that is rectangular. The combustion gas seal for injectors 300 has a configuration that seals an annular space between the injector 500 and a mounting hole disposed in an engine head 600.

In this case, the combustion gas seal for injectors 300 exhibits stable sealing performance (the state shown in FIG. 8(*a*)) in an initial state because a mashed portion remains.

However, creep deformation is generated with time by a difference in thermal expansion between the engine head 600 and the combustion gas seal for injectors 300 due to the combustion gas seal for injectors 300 being used for a long period of time in a hot environment, whereby the mashed portion becomes zero (the state shown in FIG. 8(*b*)).

In this manner, when the environmental temperature becomes low (e.g., –40° C.) in a state in which the mashed portion has become zero, a space is generated by the contraction of the combustion gas seal for injectors 300, and gas leaks (the state shown in FIG. 8(*c*)).

From the above, it was understood that, when the cross-sectional shape of the attachment groove is rectangular, it is difficult to maintain stable sealing performance over a long period of time.

Thus, in the present embodiment, a tapered surface 31*b* that serves as an inclined surface in which an clearance between the inclined surface and the inner peripheral surface 41 of the mounting hole of the engine head 40 narrows from an engine bore side (E), which serves as a pressurized side, towards an atmospheric side (A), which serves as a opposite-pressurized side, is disposed at the groove bottom 31*a* of the attachment groove 31 of the injector 30.

Additionally, an abutment portion 12*a*, which abuts against the tapered surface 31*b* disposed at the groove bottom 31*a* of the attachment groove 31, is disposed at the combustion gas seal for injectors 1.

Here, the cross-sectional shape of the combustion gas seal for injectors 1 may be rectangular. Also, the abutment portion 12*a* may have a tapered shape, along the tapered surface 31*b* disposed at the groove bottom 31*a* of the attachment groove 31, in which the clearance between the inclined surface and the inner peripheral surface 41 of the mounting hole of the engine head 40 similarly narrows towards the atmospheric side (A).

Thus, as shown in FIG. 2, when the combustion gas seal for injectors 1 receives pressure PO from the engine bore side (E), the abutment portion 12*a* receives a reaction force P1 from the tapered surface 31*b*. Thus, a surface force P2 with respect to the inner peripheral surface 41 of the mounting hole of the first seal surface 11 is generated by the component force thereof.

Also, even if creep deformation occurs with time, the abutment portion 12*a* of the combustion gas seal for injectors 1 slides along the tapered surface 31*b* disposed at the groove bottom 31*a* due to the pressure PO being applied from the engine bore side (E). Therefore, the first seal surface 11 is always in tight contact with the inner peripheral surface 41 of the mounting hole in a state in which sufficient surface pressure is held.

In this manner, in the present embodiment, sealing performance is improved and stable sealing performance is exhibited over a long period of time.

Next, the shapes and dimensions of each configuration will be described with particular reference to FIGS. 3 and 4.

First, the cross-sectional shape of the attachment groove 31 disposed in the injector 30 will be described with reference to FIG. 3.

As is illustrated, a taper angle $\alpha$ (in the cross-sectional shape, the angle of inclination toward the inner peripheral surface 41 from a surface parallel to the inner peripheral surface 41 of the mounting hole of the engine head 40) of the tapered surface 31*b* disposed at the groove bottom 31*a* is 0 to 90°, preferably 5 to 60°, and more preferably 5 to 45°.

A height a of the side surface at the side at which the taper is disposed is 0 mm or more, and preferably 0.05 mm to 0.5 mm.

A length b of the portion disposed with the taper is, with respect to a length c of the overall groove bottom (b+c), 90% or less, and more preferably 20 to 50%.

Next, the cross-sectional shape of the combustion gas seal for injectors 1 will be described with reference to FIG. 4.

As is illustrated, a taper angle $\beta$ in a case where the abutment portion 12*a* disposed at the combustion gas seal for injectors 1 has a tapered shape is set so that it is equal to or less than the taper angle $\alpha$ of the tapered surface 31*b* disposed at the groove bottom 31*a* (i.e., so that $\beta \leqq \alpha$). It should be noted that it is preferable that $\beta$=0°, i.e., to make the cross section rectangular without disposing a taper.

A length d of the portion disposed with the taper is set so that it is equal to or less than the length b of the portion disposed with the taper in the tapered surface 31*b* disposed at the groove bottom 31*a* (i.e., so that $d \leqq b$). However, as described above, it is preferable that d=0 mm, i.e., to make the cross section rectangular without disposing a taper.

By setting, in this manner, the dimensions and the cross-sectional shapes of the combustion gas seal for injectors 1 and the attachment groove 31 disposed in the injector 30, sealing performance is, as mentioned above, improved, and it becomes possible to exhibit stable sealing performance over a long period of time.

Next, the filling coefficient of the combustion gas seal for injectors 1 will be described. In the combustion gas seal for injectors 1 according to the embodiments of the invention, the filling coefficient with respect to the attachment portion is set to be 100% or less.

That is, as shown in FIG. 3, when the cross-sectional area of the cross section of the annular space portion formed by the inner peripheral surface 41 of the mounting hole of the engine head 40 and the attachment groove 31 disposed in the injector 30 is A1 and, as shown in FIG. 4, the cross-sectional area of the combustion gas seal for injectors 1 (cross-sectional area in a state in which the combustion gas seal for injectors 1 is not compressed, and so on, before attachment) is A2, they are set so that $A2+A1 \leqq 1$.

Next, results when evaluation was conducted in relation to the combustion gas seal for injectors according to the present embodiment will be described with reference to FIGS. 5 to 7.

With regard to evaluation testing, as shown in FIG. 5, a jig 202 was disposed in a constant temperature bath 201. And, $N_2$ gas was sent from a nitrogen cylinder 203 to the seal portion of the combustion gas seal for injectors disposed in the jig. And, $N_2$ gas that leaked accumulated in a container 205 disposed in a water tank 204, and the leakage amount was measured by measuring the accumulated amount.

The jig 202 was configured by a supply shaft 301 corresponding to the injector, a supply housing 302 corresponding to the engine head, and an O-ring 202*a* that prevented leakage from the space therebetween.

And, the combustion gas seal for injectors was attached to the attachment groove disposed in the supply shaft 301, and the annular space between the supply shaft 301 and the supply housing 302 was sealed. The $N_2$ gas was sent to the seal portion.

More specifically, first, after the combustion gas seal for injectors was attached, the combustion gas seal for injectors was left in an environment of 150° C. for 50 hours with no pressure. Thus, the leakage amount was measured at −40° C. by pressurizing the $N_2$ gas after creep deformation had been accelerated.

Here, in order to conduct evaluation in regard to the combustion gas seal for injectors according to the embodiments of the invention, the evaluation was conducted using, as shown in FIG. 6(*a*), a supply shaft 301*a* in which the attachment groove including the tapered surface was formed, and using, as shown in FIG. 6(*d*), an combustion gas seal for injectors 1*b* having a cross-sectional rectangular shape that was not disposed with a tapered surface.

The dimensions of each part were as illustrated.

Similarly, in order to conduct evaluation in regard to the combustion gas seal for injectors according to the embodiments of the invention,the evaluation was conducted using, as shown in FIG. 6(*a*), the supply shaft 301*a* in which the attachment groove including the tapered surface was formed, and using, as shown in FIG. 6(*b*), an combustion gas seal for injectors 1*a* including a tapered surface. The dimensions of each part were as illustrated.

Moreover, for comparison, the evaluation was conducted using, as shown in. FIG. 6(*c*), a supply shaft 301*b* in which the cross-sectionally rectangular attachment groove was not disposed with a tapered surface, and using, as shown in FIG. 6(*d*), the cross-sectionally rectangular combustion gas seal for injectors 1*b* that was not disposed with a tapered surface. The dimensions of each part were as illustrated.

It should be noted that, in regard to any of these, aluminium (AL) was used for the material of the supply housing 302, stainless steel (SUS) was used for the material of the supply shaft 301, and filler-including PTFE (polytetrafluoroethylene) was used for the material of the combustion gas seal for injectors.

As a result of the evaluation testing, the relation between the pressure of the supplied $N_2$ gas and the gas leakage amount was as shown in the graph of FIG. 7.

As is clear from the drawing, it will be understood that the combustion gas seal for injectors in which the tapered surface was disposed at the attachment groove, as in the embodiments of the present invention, had excellent sealing performance with little gas leakage in comparison with the case in which the tapered surface was not disposed.

It will also be understood that the combustion gas seal for injectors whose cross-section was rectangular and in which the taper was not disposed was more excellent.

(Second Embodiment)

Figure 9:
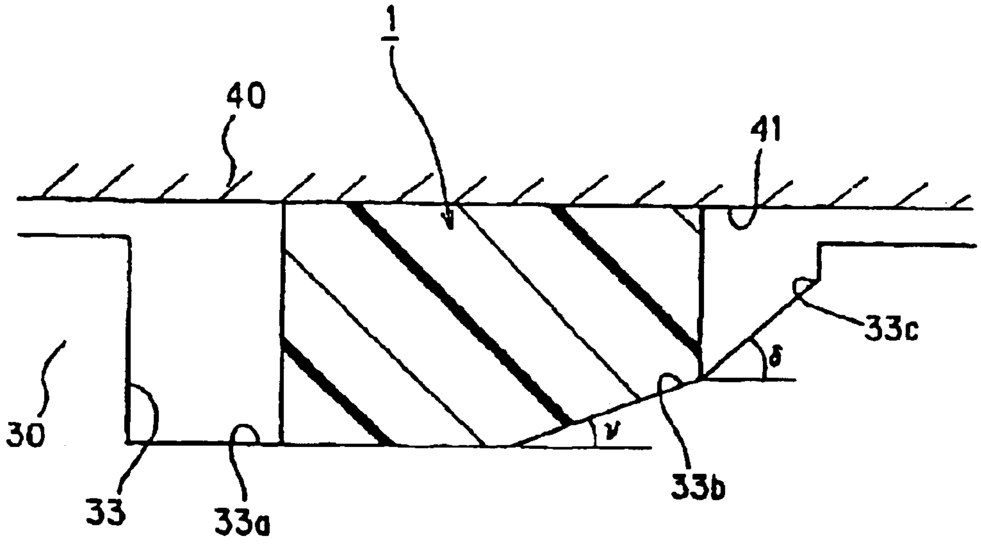
FIG. 9 is a schematic cross-sectional diagram showing a seal structure according to a second embodiment of the invention.

A second embodiment is shown in FIG. 9. In the first embodiment, a case was described in which the inclined surface disposed at the bottom of the attachment groove was configured by one tapered surface. However, in the present embodiment, a case is described in which the inclined surface is configured by plural tapered surfaces.

Because the other structures and action in the present embodiment are the same as those of the first embodiment, the same reference numerals are given to the same structural portions and explanation thereof will be omitted.

FIG. 9 is a schematic cross-sectional diagram showing a seal structure according to the second embodiment of the invention.

As is illustrated, the present embodiment has a configuration in which a first tapered surface 33*b* and a second tapered surface 33*c* that serve as inclined surfaces in which the clearance between the inclined surfaces and the inner peripheral surface 41 of the mounting hole of the engine head 40 narrows from the engine bore side, which serves as a pressurized side, towards the atmospheric side, which serves as a opposite-pressurized side, are adjacently disposed at a groove bottom 33*a* of an annular attachment groove 33 disposed in (the outer periphery of) the edge portion of the injector 30.

And, the angles of inclination of the first tapered surface 33*b* and the second tapered surface 33*c* are set so that the degree of diameter expansion, in which the diameter expands towards the opposite-pressurized side, becomes greater in the second tapered surface 33*c* at the opposite-pressurized side.

That is, in FIG. 9, the angles of inclination with respect to the ordinary groove bottom portion satisfy the relation that an angle $\gamma$ of the first tapered surface 33*b* is less than an angle $\delta$ of the second tapered surface 33*c*.

According to the above configuration, similar to the case of the first embodiment, the combustion gas seal for injectors 1 slides toward the opposite-pressurized side due to pressure being applied thereto from the engine bore side as creep deformation proceeds with time. And, in this case, surface pressure with respect to the inner peripheral surface 41 of the mounting hole is generated by a reaction force received from the first tapered surface 33*b,* and it becomes possible to maintain sealing performance.

Additionally, in the case of the present embodiment, the first tapered surface 33*b* and the second tapered surface 33*c*, which have respectively different angles of inclination, are disposed, and the degree of diameter expansion is greater in the second tapered surface 33*c*. Therefore, it is clear that, in a case in which pressure P is received from the engine bore side, the relation between a sliding amount X1, when the end portion of the combustion gas seal for injectors 1 slides along the first tapered surface 33*b*, and a sliding amount X2, when the end portion of the combustion gas seal for injectors 1 slides along the second tapered surface 33*c*, is one in which X1 is greater than X2.

Thus, the combustion gas seal for injectors 1 slides toward the opposite-pressurized side with time, but the sliding amount is reduced when the end portion thereof reaches the second tapered surface 33*c*. Thus, in comparison with the case of the first embodiment, it becomes possible to extend the period of time in which it is possible for the combustion gas seal for injectors 1 to slide.

Therefore, because surface pressure with respect to the inner peripheral surface 41 of the mounting hole can be maintained during the period in which it is possible for the combustion gas seal for injectors 1 to slide, stable sealing performance can be maintained. Thus, the combustion gas seal for injectors 1 has excellent longevity in comparison with the case of the first embodiment.

Here, the smaller the groove depth, the greater the surface pressure with respect to the inner peripheral surface 41 of the mounting hole becomes, and the greater the sliding amount of the combustion gas seal for injectors 1 becomes. Conversely, the larger the groove depth, the smaller the surface pressure with respect to the inner peripheral surface 41 of the mounting hole becomes, and the smaller the sliding amount of the combustion gas seal for injectors 1 becomes.

Therefore, although it is preferable for the sliding amount to be small and for the surface pressure to be large, it is difficult to balance both with only the groove depth. Thus, in the present embodiment, the combustion gas seal for injectors 1 can maintain surface pressure with the first tapered surface 33*b* and can reduce the sliding amount by reaching the second tapered surface 33*c*.

It should be noted that, although description has been given in the explanation up until now of a case where the inclined surfaces are configured by two types of tapered surfaces, the embodiment is of course not limited to two types, and the inclined surfaces can be further configured by plural tapered surfaces. In this case, it goes without saying that the angle of inclination of each tapered surface should be set so that the degree of diameter expansion of the tapered surfaces becomes successively larger towards the opposite-pressurized side.

(Third Embodiment)

Figure 10:
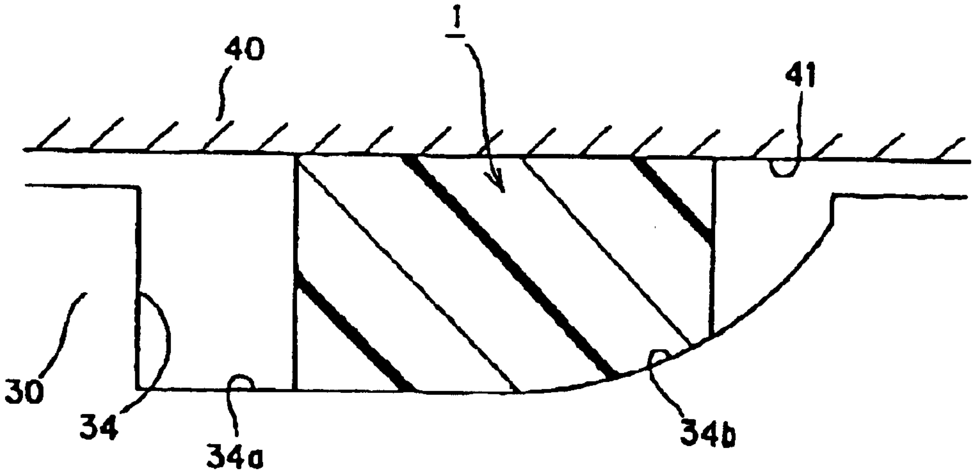
FIG. 10 is a schematic cross-sectional diagram showing a seal structure according to a third embodiment of the invention.

A third embodiment is shown in FIG. 10. Although a case was described in the first embodiment in which the inclined surface disposed at the bottom of the attachment groove was configured by a tapered surface, a case where the inclined surface is configured by a gently curved surface is described in the present embodiment.

Because the other structures and action in the present embodiment are the same as those of the first embodiment, the same reference numerals are given to the same structural portions and explanation thereof will be omitted.

FIG. 10 is a schematic cross-sectional diagram showing a seal structure according to the third embodiment of the invention.

As is illustrated, the present embodiment has a configuration in which a gently curved surface 34*b* that serves as an inclined surface in which the clearance between the inclined surface and the inner peripheral surface 41 of the mounting hole of the engine head 40 narrows from the engine bore side, which serves as a pressurized side, towards the atmospheric side, which serves as a opposite-pressurized side, is disposed at a groove bottom 34*a* of an annular attachment groove 34 disposed in (the outer periphery of) the edge portion of the injector 30.

This can be said to be a configuration in which, in the configuration disposed with plural tapered surface as in the second embodiment, a limitless number of tapered surfaces are continuously disposed.

By configuring the invention is this manner, the sliding amount as the combustion gas seal for injectors 1 slides towards the opposite-pressurized side with time is gradually reduced, and it becomes possible to obtain the same effects as in the case of the second embodiment.

(Fourth Embodiment)

Figure 12:
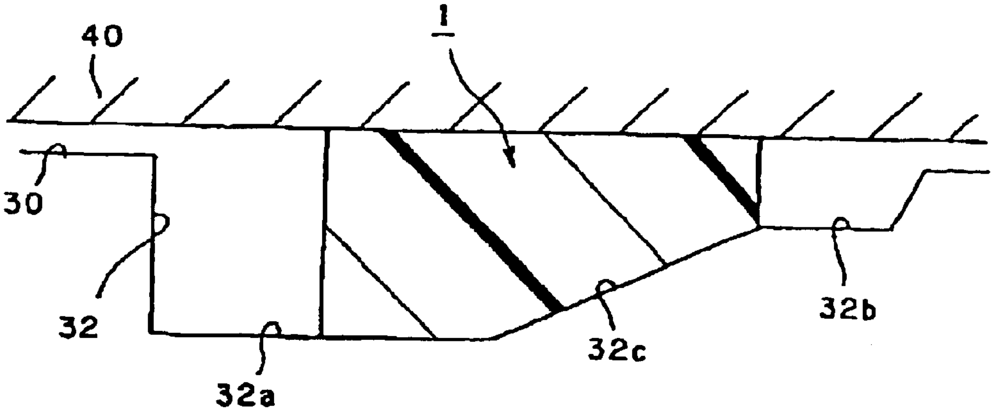
FIG. 12 is a schematic cross-sectional diagram showing a seal structure according to a fourth embodiment of the invention.
Figure 13:
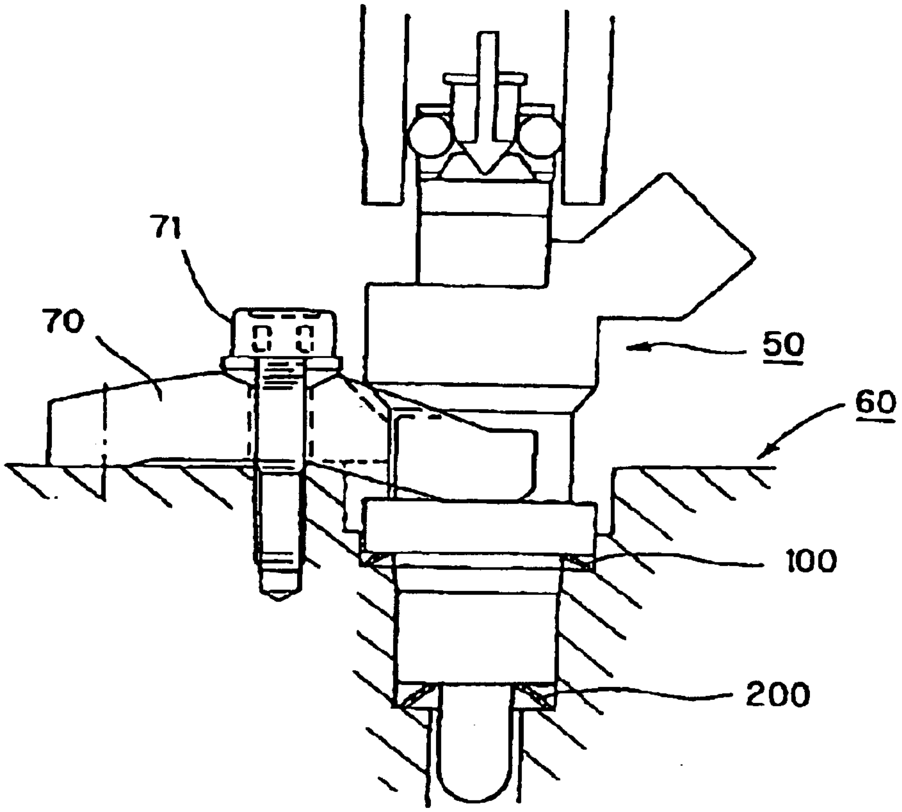
FIG. 13 is a schematic structural diagram showing a state, in which an injector is mounted to an engine head.
Figure 14:
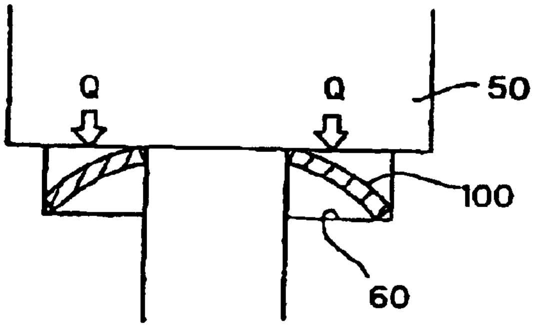
FIG. 14 is a schematic diagram for describing a seal structure of a combustion gas seal for injectors according to conventional art.

A fourth embodiment is shown in FIG. 12. In the present embodiment, the attachment groove is configured by a two-stepped groove.

Because the other structures and action in the present embodiment are the same as those of the first embodiment, the same reference numerals are given to the same structural portions and explanation thereof will be omitted.

Figure 11:
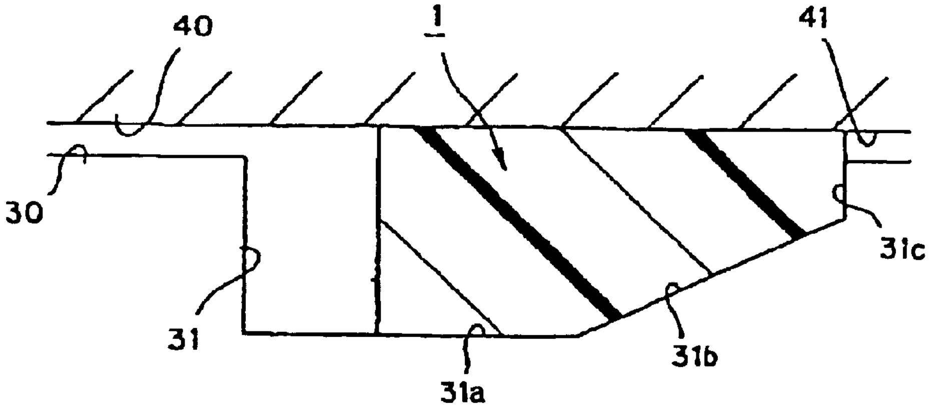
FIG. 11 is a schematic cross-sectional diagram showing the seal structure according to the first embodiment of the invention.

Because the first embodiment, as shown in FIG. 11, has a configuration in which the tapered surface 31*b* is simply disposed at the opposite-pressurized side (atmospheric side (A)) of the groove bottom 31*a* of the attachment groove 31, a side wall surface 31*c* is present at the atmospheric side (A).

Therefore, depending on the conditions of the respective dimensions, shapes and pressure, and environmental conditions, sometimes the combustion gas seal for injectors 1 moves with time towards the atmospheric side (A) and, as shown in FIG. 11, the end surface thereof abuts against the side wall surface 31*c*.

Because the combustion gas seal for injectors 1 does not slide any further when the combustion gas seal for injectors 1 abuts against the side wall surface 31*c*, surface pressure with respect to the inner peripheral surface 41 of the mounting hole is not generated and sealing performance drops.

Thus, the present embodiment has a configuration in which sliding regulation of the combustion gas seal for injectors 1 is eliminated.

FIG. 12 is a schematic cross-sectional diagram showing a seal structure according to the fourth embodiment of the invention.

As is illustrated, in the present embodiment, the annular attachment groove 32 disposed in (the outer periphery of) the edge portion of the injector 30 is configured by a two-stepped groove that includes a first groove portion 32*a*, which has a deep groove bottom, and a second groove portion 32*b*, which has a shallower groove portion than that of the first groove portion 32*a*. Also, a tapered surface 32*c* that serves as an inclined surface joins the first groove portion 32*a* and the second groove portion 32*b*.

In an initial state, similar to the first embodiment, the combustion gas seal for injectors 1 is attached at a position at which the first groove portion 32*a* and the tapered surface 32*c* are disposed.

According to the above configuration, even in a case where the combustion gas seal for injectors 1 slides toward the atmospheric side (A) due to creep deformation with time and the end at the atmospheric side exceeds the tapered surface 32*c*, the combustion gas seal for injectors 1 can further slide only by the amount disposed with the second groove portion 32*b* in comparison with the case of the first embodiment, whereby surface pressure with respect to the inner peripheral surface 41 of the mounting hole can be maintained.

Therefore, a drop in surface pressure can be prevented, and it also becomes possible to improve seal life.

It should be noted that the inclined surface joining the clearance between the first groove portion 32*a* and the second groove portion 32*b* is not limited to the one tapered surface 32*c* shown in FIG. 12. The inclined surface may be configured by plural tapered surfaces, as in the second embodiment, or by a curved surface, as in the third embodiment.

INDUSTRIAL APPLICABILITY

As described above, with the present invention, it becomes possible to reduce vibration and noise while reducing the number of parts, and to improve sealing performance.

What is claimed is:

1. A seal structure comprising:

a mounting hole that mounts an injector and is disposed in an engine head;

an annular attachment groove disposed in the injector; and a resin-made combustion gas seal for injectors that is attached to the attachment groove, seals an annular space between the mounting hole and a groove bottom of the attachment groove, and can slide along the groove bottom of the attachment groove, wherein an inclined surface, in which a clearance between the inclined surface and an inner peripheral surface of the mounting hole narrows towards an opposite-pressurized side, is disposed at the groove bottom of the attachment groove, and the combustion gas seal for injectors, due to pressure from a pressurized side, slides toward the opposite-pressurized side and is subjected to reactive force from the inclined surface, and that component of force generates a surface force on the inner peripheral surface of the mounting hole.

2. The seal structure of claim 1, wherein the inclined surface is a tapered surface whose diameter expands towards the opposite-pressurized side.

3. The seal structure of claim 1, wherein the inclined surface is configured by a plurality of tapered surfaces having respectively different angles of inclination, and the angle of inclination of each tapered surface is set so that a degree of diameter expansion of the tapered surfaces becomes successively larger towards the opposite-pressurized side.

4. The seal structure of claim 1, wherein the inclined surface is a curved surface in which a degree of diameter expansion becomes larger towards the opposite-pressurized side.

5. The seal structure of claim 1, wherein the attachment groove is configured by a two-stepped groove that includes a first groove portion, which has a deep groove bottom, and a second groove portion, which has a shallower groove bottom than that of the first groove portion, with the inclined surface being disposed between the first groove portion and the second groove portion, and the combustion gas seal for injectors is attached, in an initial state, at a portion at which the first groove portion and the inclined surface are disposed.

6. The seal structure of claim 1, wherein a cross-sectional shape of the combustion gas seal for injectors is rectangular.

7. The seal structure of claim 1, wherein an inclined surface, in which the clearance between the inclined surface and the inner peripheral surface of the mounting hole narrows towards the opposite-pressurized side along the inclined surface disposed at the groove bottom of the attachment groove, is disposed at a seal surface side, against the groove bottom of the attachment groove, of the combustion gas seal for injectors.

8. A resin-made combustion gas seal for injectors that is attached at an attachment groove disposed in an injector mounted in a mounting hole of an engine head, seals an annular space between the mounting hole and a groove bottom of the attachment groove, and can slide along the groove bottom of the attachment groove, the combustion gas seal for injectors including a first seal surface that is in tight contact with an inner peripheral surface of the mounting hole, and a second seal surface that is in tight contact with the groove bottom of the attachment groove, wherein an abutment portion that abuts against an inclined surface, in which a clearance between the inclined surface and an inner peripheral surface of the mounting hole narrows towards an opposite-pressurized side, that is disposed at the groove bottom of the attachment groove is disposed at the second seal surface, and due to pressure from a pressurized side, the combustion gas seal for injectors slides towards the opposite-pressurized side and the abutment portion at the second seal surface thereof is subjected to reactive force from the inclined surface, and that component of force generates surface pressure on the inner peripheral surface of the mounting hole.

9. The combustion gas seal for injectors of claim 8, wherein an inclined surface, in the clearance between the inclined surface and the inner peripheral surface of the mounting hole narrows towards the opposite-pressurized side along the inclined surface disposed at the groove bottom of the attachment groove, is disposed at the abutment portion.

* * * * *

UNITED STATES PATENT AND TRADEMARK OFFICE

CERTIFICATE OF CORRECTION

PATENT NO. : 6,938,901 B2
DATED : September 6, 2005
INVENTOR(S) : Tsuchiya et al.

It is certified that error appears in the above-identified patent and that said Letters Patent is hereby corrected as shown below:

Title page,
Item [75], Inventors, change "Nihomatsu" to -- Nihonmatsu --.

Signed and Sealed this

Twenty-third Day of May, 2006

JON W. DUDAS
*Director of the United States Patent and Trademark Office*